(12) United States Patent
Lane

(10) Patent No.: US 11,396,410 B2
(45) Date of Patent: Jul. 26, 2022

(54) LID FOR FOOD CONTAINER

(71) Applicant: THERMOS L.L.C., Schaumburg, IL (US)

(72) Inventor: Marvin Lane, Brandon, MS (US)

(73) Assignee: THERMOS L.L.C., Schaumburg, IL (US)

( * ) Notice: Subject to any disclaimer, the term of this patent is extended or adjusted under 35 U.S.C. 154(b) by 0 days.

(21) Appl. No.: 16/997,159

(22) Filed: Aug. 19, 2020

(65) Prior Publication Data

US 2021/0053731 A1 Feb. 25, 2021

Related U.S. Application Data

(60) Provisional application No. 62/889,358, filed on Aug. 20, 2019.

(51) Int. Cl.
| | | |
|---|---|---|
| *B65D 51/24* | (2006.01) | |
| *B65D 41/46* | (2006.01) | |
| *B65D 43/16* | (2006.01) | |
| *B65D 51/26* | (2006.01) | |
| *B65D 43/22* | (2006.01) | |

(52) U.S. Cl.
CPC ......... *B65D 51/246* (2013.01); *B65D 41/465* (2013.01); *B65D 43/169* (2013.01); *B65D 43/22* (2013.01); *B65D 51/26* (2013.01); *B65D 2401/25* (2020.05); *B65D 2401/50* (2020.05); *B65D 2543/00222* (2013.01)

(58) Field of Classification Search
CPC .......... B65D 2251/0018; B65D 51/246; B65D 41/465; B65D 43/169; B65D 43/22; B65D 51/26; B65D 2401/25; B65D 2401/50; B65D 2543/00222
See application file for complete search history.

(56) References Cited

U.S. PATENT DOCUMENTS

| | | | |
|---|---|---|---|
| 9,211,040 B2 | 12/2015 | Lane | |
| 9,878,832 B2 * | 1/2018 | Sims | B65D 41/04 |
| 9,944,437 B2 * | 4/2018 | Lin | B65D 47/088 |
| 10,899,512 B2 | 1/2021 | Lane | |
| 2008/0156806 A1 * | 7/2008 | Perry | B65D 51/20 |
| | | | 220/361 |
| 2013/0248531 A1 * | 9/2013 | Lane | A47J 47/02 |
| | | | 220/262 |
| 2018/0079565 A1 * | 3/2018 | Seibert | B65D 43/24 |
| 2018/0237190 A1 * | 8/2018 | Iwasaki | B65D 47/08 |

FOREIGN PATENT DOCUMENTS

| | | |
|---|---|---|
| CN | 103662353 B | 4/2017 |
| CN | 108502347 B | 12/2020 |

OTHER PUBLICATIONS

English translation of Office Action issued in Taiwan Patent Application No. 109128299 (15 pages) dated Jun. 7, 2021.

* cited by examiner

*Primary Examiner* — Shawn M Braden
(74) *Attorney, Agent, or Firm* — Polsinelli PC

(57) ABSTRACT

A lid assembly for a food container is described that may be used to store and transport food items. The container defines an interior to store a food product. The lid assembly includes a lid and a stopper that is sized to close an opening of the container. A biasing member urges the lid to an open position when the lid is unlocked or unlatched.

20 Claims, 7 Drawing Sheets

LID FOR FOOD CONTAINER

This application claims priority to U.S. Provisional Patent Application No. 62/889,358 filed Aug. 20, 2019.

FIELD OF INVENTION

The present invention relates to lid for a food container which may be used for storing or transporting food or other items.

BACKGROUND

Certain containers are often used to store and transport food items or other items. In the past, food containers generally do not include a storage region. Utensils, condiment, food items are often needed to be carried along with the food container. Such extra items may be easy to forget or misplace. Certain other food containers do not include a lid biasing structure, so the user must manually open the lid the entire way.

SUMMARY

A lid assembly and container is described that may be used to store and transport food items or drink items. The container includes an insulated or uninsulated structure to store the food items, possibly at warmed or chilled temperatures for later consumption.

The lid assembly and container may include a container, a stopper, a cap, and a lid. The container includes an interior to store a food item or could be configured to store beverage items. The stopper closes an opening of the container. The cap engages to the container to hold the stopper in the opening. The lid is pivotally or hingedly engaged to the cap. The lid opens to reveal a storage region between the cap and the lid. A biasing member urges the lid to an open position when the lid is unlocked or unlatched.

In one aspect, a food container is described. The food container includes a container and a lid assembly. The container defines an interior to store a food product. The container forms an opening. The lid assembly may include a stopper, a cap, and a lid. The stopper is sized to removably close the opening of the container. The cap is configured to hold the stopper in a closed position over the opening of the container. The cap and lid may include complementary biasing structures. For example, the cap includes a first complementary biasing structure such as a projecting member. The lid is movably engaged to the cap. The lid is configured to move between an open position and a closed position. The lid includes a second complementary biasing structure such as a receiving member. The projecting member engages the receiving member to bias the lid to the open position. In other aspects, the location of the complementary biasing structures may be reversed—that is, a projecting member may be positioned on the lid, and the receiving member may be positioned on the cap.

In another aspect, the projecting member extends upward from an upper surface of the cap, and the receiving member extends downward from an inner surface of the lid. The projecting member compresses or biases a biasing member contained by the receiving member. A lock or latch holds the lid in the closed position and the biasing member under bias. When the user unlocks or unlatches the lid, the lid automatically springs open, as the biasing member urges it open.

In another aspect, moving the lid to the closed position compresses or biases the biasing member.

In another aspect, the food container includes a biasing member configured to urge the lid to the open position, wherein the lid and the cap include complementary locking or latching structures that lock or latch to hold the lid in the closed position, an engagement between the projecting member and the receiving member biases the biasing member, and bias from the biasing member moves the lid to the open position when the complementary locking or latching structures are unlocked or unlatched.

In another aspect, the cap is configured to engage an upper region of the container and fit over the stopper.

In another aspect, the lid and the cap include complementary locking or latching structures that hold the lid in the closed position, wherein a biasing member urges or drives the lid to the open position when the complementary locking or latching structures are unlocked or unlatched.

In another aspect, the lid and the cap include complementary locking or latching structures comprising a button member that holds the lid in the closed position relative to the cap, wherein a biasing member automatically urges or drives the lid to the open position when the button of the complementary locking or latching structures is pressed.

In another aspect, the receiving member includes a cylindrical shaped element with an open interior that holds the biasing member. A distal portion of the projecting member enters the receiving member to compress or bias the biasing member.

In another aspect, the lid and the container form a compartment or storage region configured to hold utensils or foods products. The lid provides a cover to the compartment or storage region.

In further aspects, the cap may screw directly to an upper portion of the container to cover the stopper or other structures of the container. The cap and the container may include complementary threaded surfaces for engaging the cap to the container. The cap holds the stopper in the opening of the container. In other aspects, the stopper's engagement with the cap may be the stopper positioned within the cap, integral with the cap, or connected to the cap. In further aspects, the cap may be used to directly close the container and no stopper is used.

In further aspects, the cap and lid described herein may be used with beverage containers. The lid may cover drink openings in the cap, spouts extending from the cap, flexible straw members passing through the cap, etc.

In further aspects, the cap forms a vent passage having a lower opening and an upper opening, and the stopper includes a vent tube having a lower opening and an upper opening. The lower opening of the vent passage is configured to be positioned over the upper opening of the vent tube to vent the container. The cap and stopper are configured to position the vent passage in-line or adjacent the vent tube.

In further aspects, a food container is described. The food container includes a container. The container defines an interior to store an edible product. The container forms an opening. The food container includes a stopper. The stopper is sized to removably close the opening of the container. The food container includes a cap. The cap is configured to hold the stopper in a closed position over the opening of the container. The cap includes a projecting member. A lid is movably engaged to the cap. The lid is configured to move between an open position and a closed position. The lid includes a receiving member. The receiving member including a biasing member. The projecting member is configured to engage the receiving member when the lid is moved to the closed positon and bias or compress the biasing member.

In further aspects, a food container is described. The food container includes a container that defines an interior to store a food product. The container forms an opening. The food container includes a stopper. The stopper sized to removably close the opening of the container. The food container includes a cap. The cap is configured to hold the stopper in a closed position over the opening of the container. The cap includes a receiving member containing a biasing member. A lid is movably engaged to the cap. The lid is configured to move between an open position and a closed position. The lid includes a projecting member. A portion of the projecting member enters the receiving member to bias the biasing member. In another aspect, the lid and the cap include complementary locking or latching structures that lock or latch to hold the lid in the closed position, and the biasing member urges the lid to the open position when the complementary locking or latching structures are unlocked or latched.

In further aspects, a lid assembly for a container is described. The lid assembly includes a stopper sized to removably close the opening of the container. The lid assembly includes a cap configured to hold the stopper in a closed position over or in the opening of the container. The cap includes a first complementary biasing structure. A lid is movably engaged to the cap via a hinge. The lid is configured to move between an open position and a closed position. The lid includes a second complementary biasing structure. The lid and the cap also interact via a locking mechanism configured to hold the lid in the closed position. The second complementary biasing structure is configured to interact with the first complementary biasing structure to bias the lid to the open position when the locking mechanism is disengaged. The first complementary biasing structure and the second complementary biasing structure are not integrated with or connected to the hinge or the locking mechanism. In another aspect, the container is configured to store or transport edible or drinkable items.

DETAILED DESCRIPTION OF INVENTION

Figure 1:
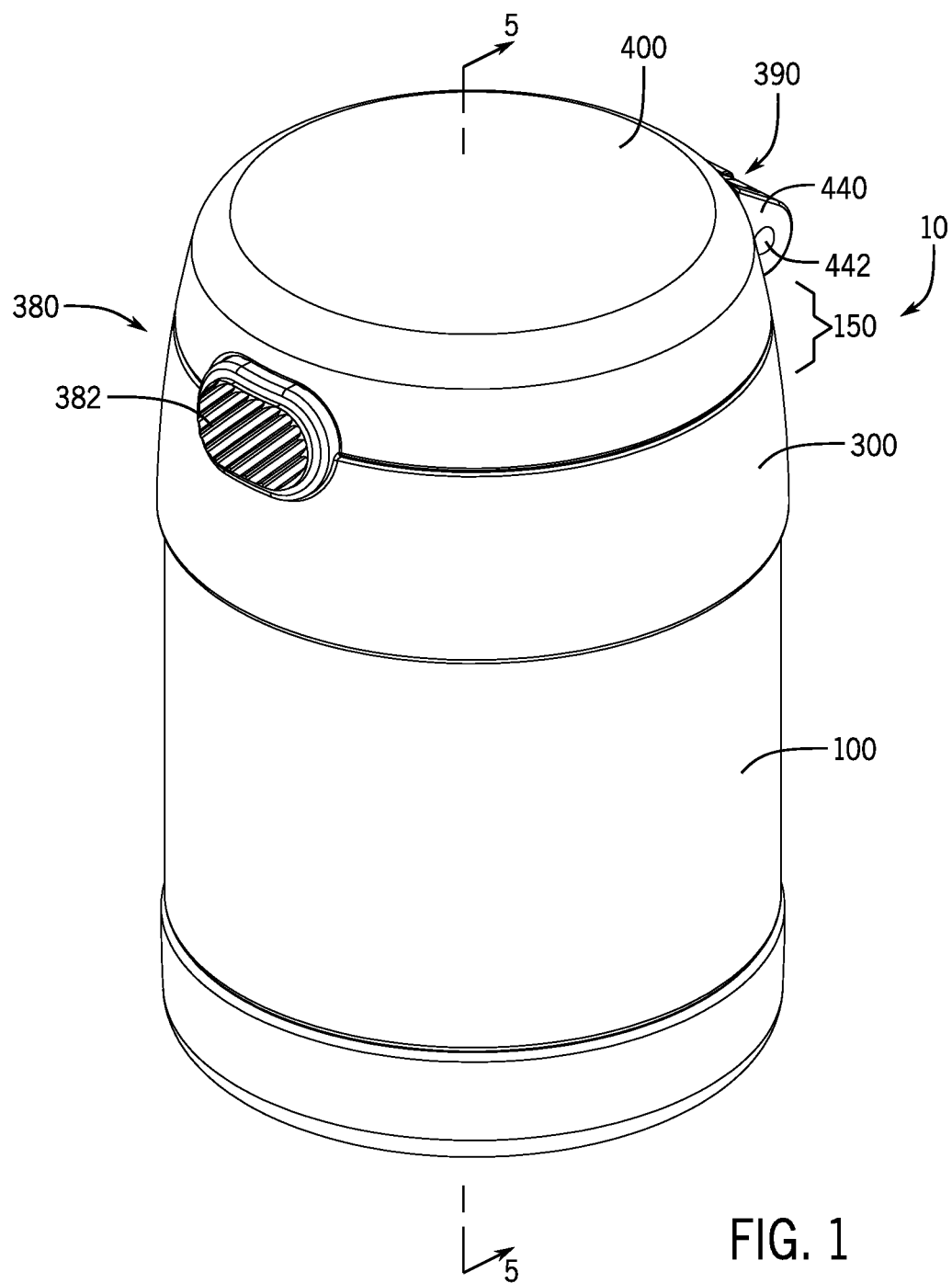
FIG. 1 is a perspective view of the food container.
Figure 2:
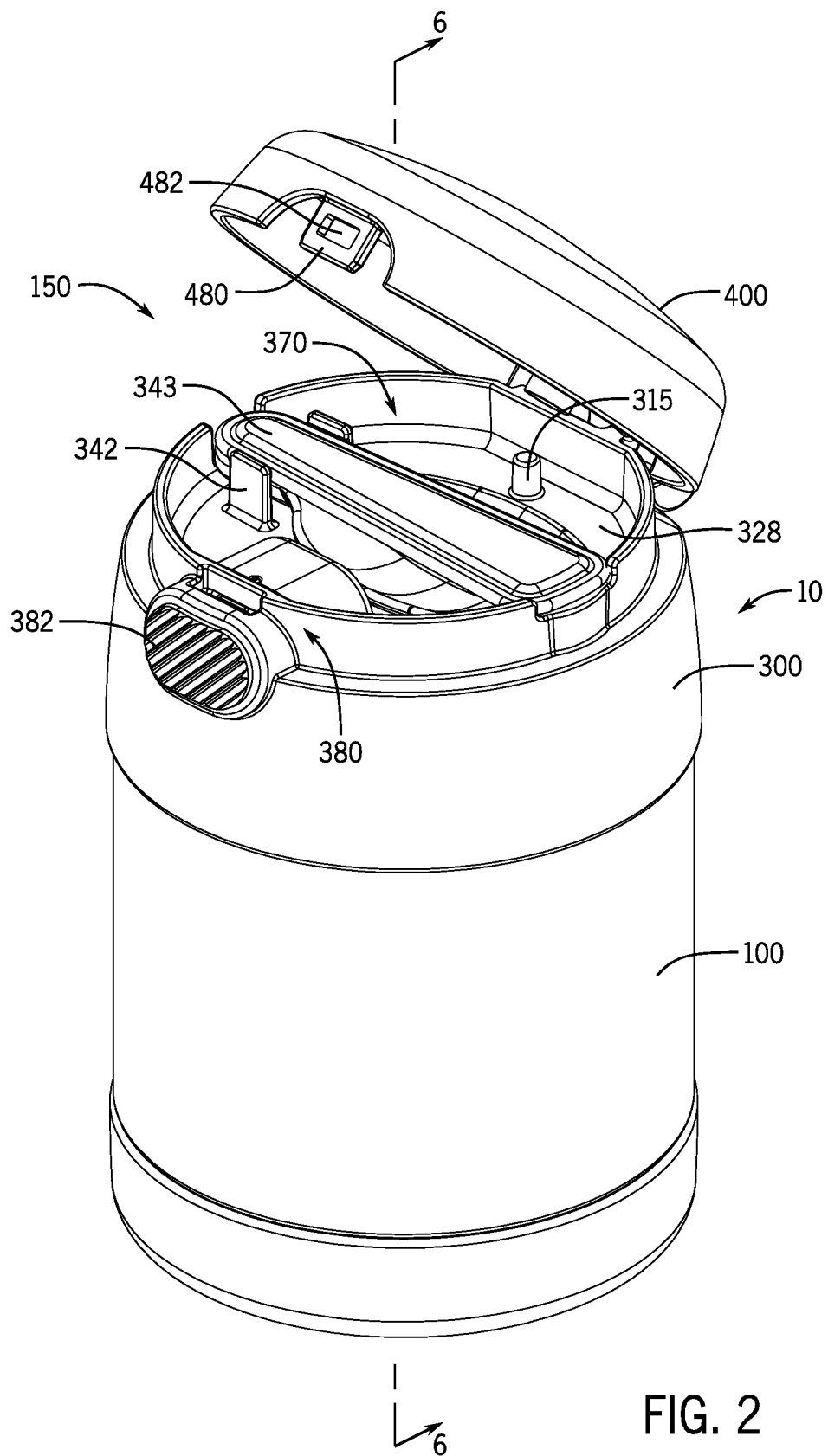
FIG. 2 is a perspective view of the food container with the lid assembly in the open position.
Figure 3:
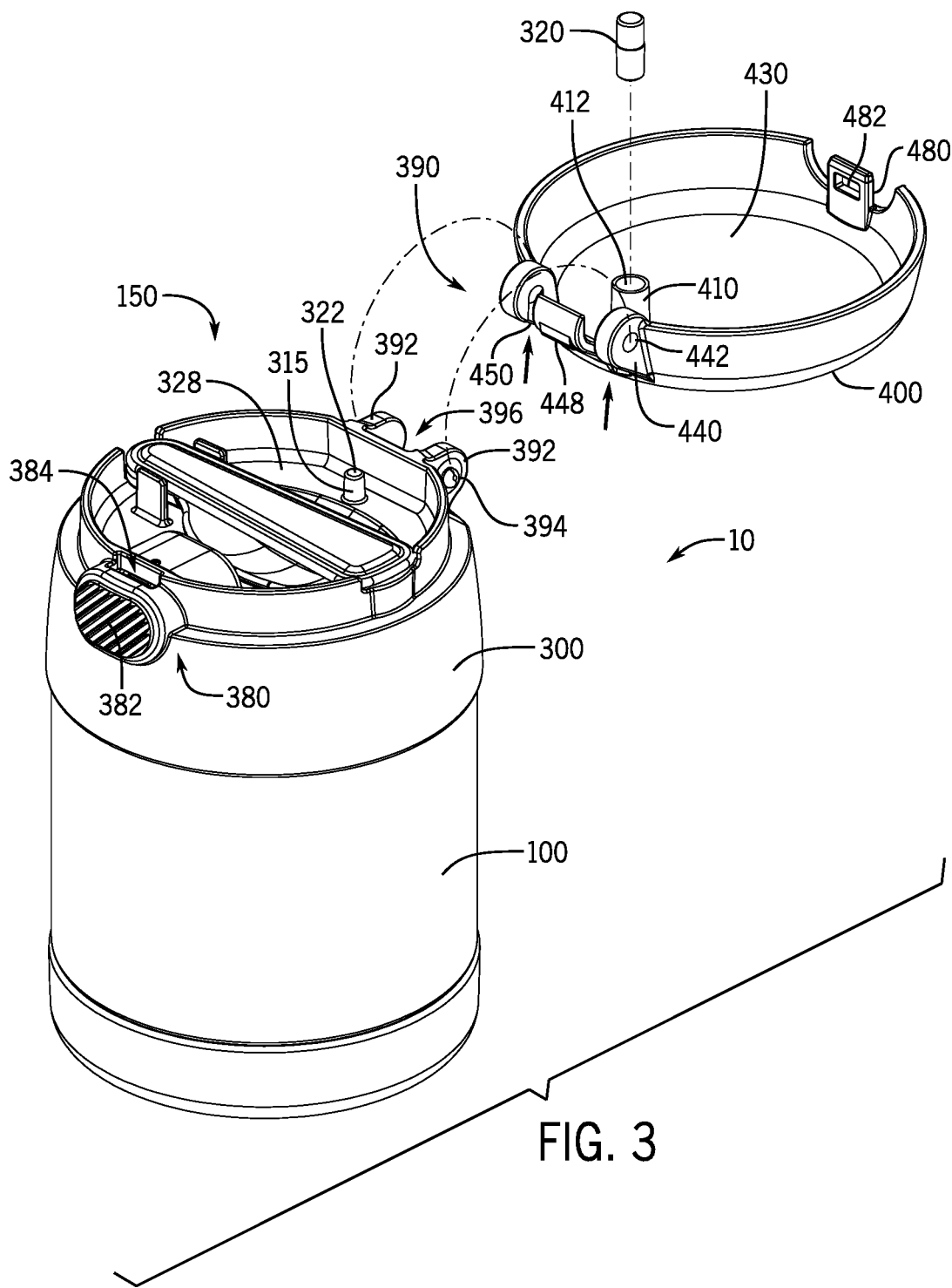
FIG. 3 is an exploded view of the lid assembly with the food container.

For purposes of this application, any terms that describe relative position (e.g., "upper", "middle", "lower", "outer", "inner", "above", "below", "bottom", "top", etc.) refer to an embodiment of the invention as illustrated, but those terms do not limit the orientation in which the embodiments can be used. A food container 10 will now be described with references to FIGS. 1-7. The food container 10 includes a container 100, and a lid assembly 150 having stopper 200, a cap 300, and a lid 400. The cap 300 removably engages to an upper portion 110 of the container 100.

The container 100 includes a wide mouth opening 102 to readily accept food items such as stews, chili, soups, beverages, or other foods that might not fit so easily into a narrow mouth container. The container 100 may be vacuum insulated or insulated with an insulating material such as foam, air, or other. The opening 102 leads into an interior 104 of the container 100 that holds the food items. The stopper 200 includes an upper portion 210, sidewalls 250, and a bottom portion 260. The stopper 200 removably engages to the upper portion 110 of the container 100 to cover the opening 102 of the container 100. The cap 300 is positioned over the stopper 200.

Figure 5:
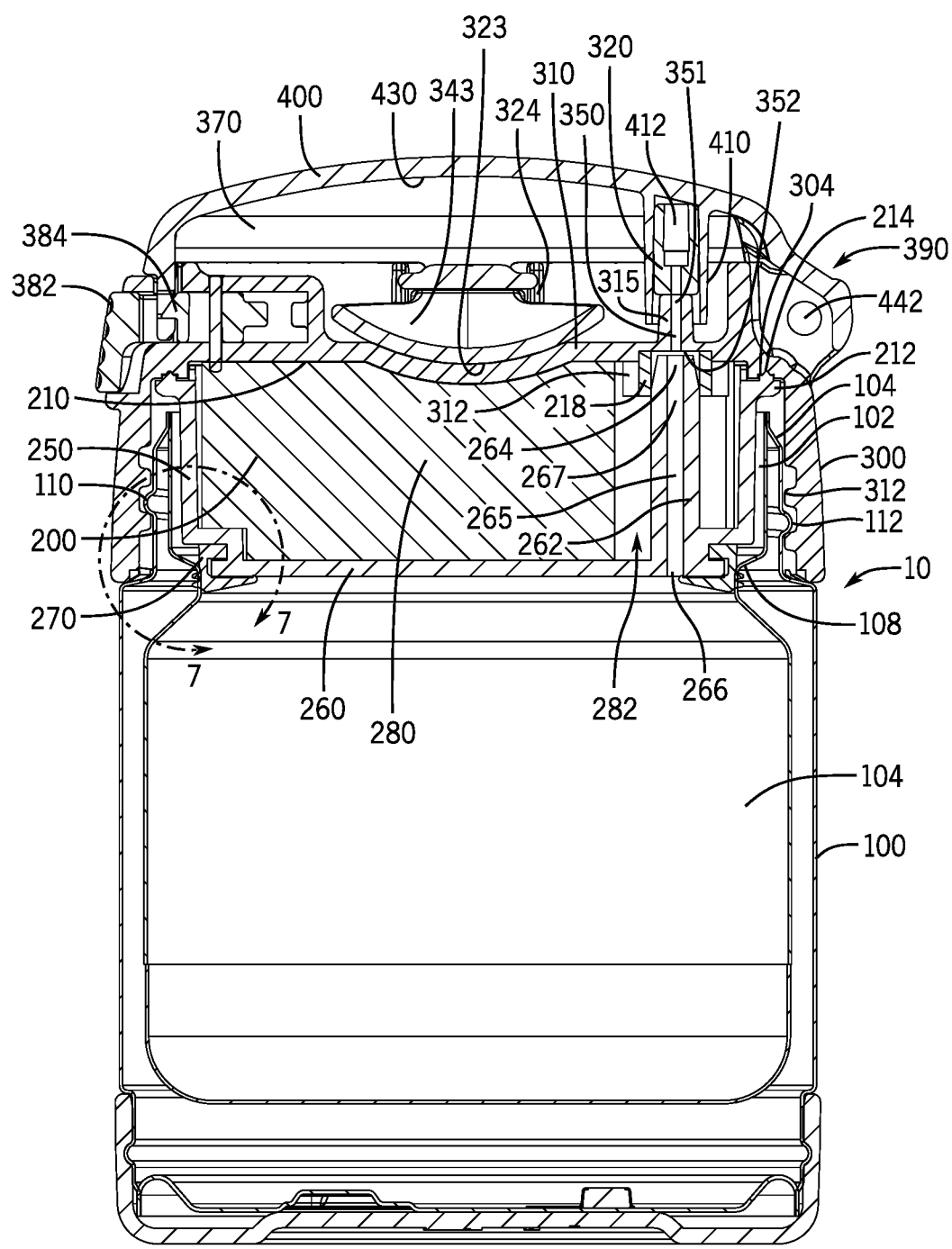
FIG. 5 is a sectional view of the food container.
Figure 6:
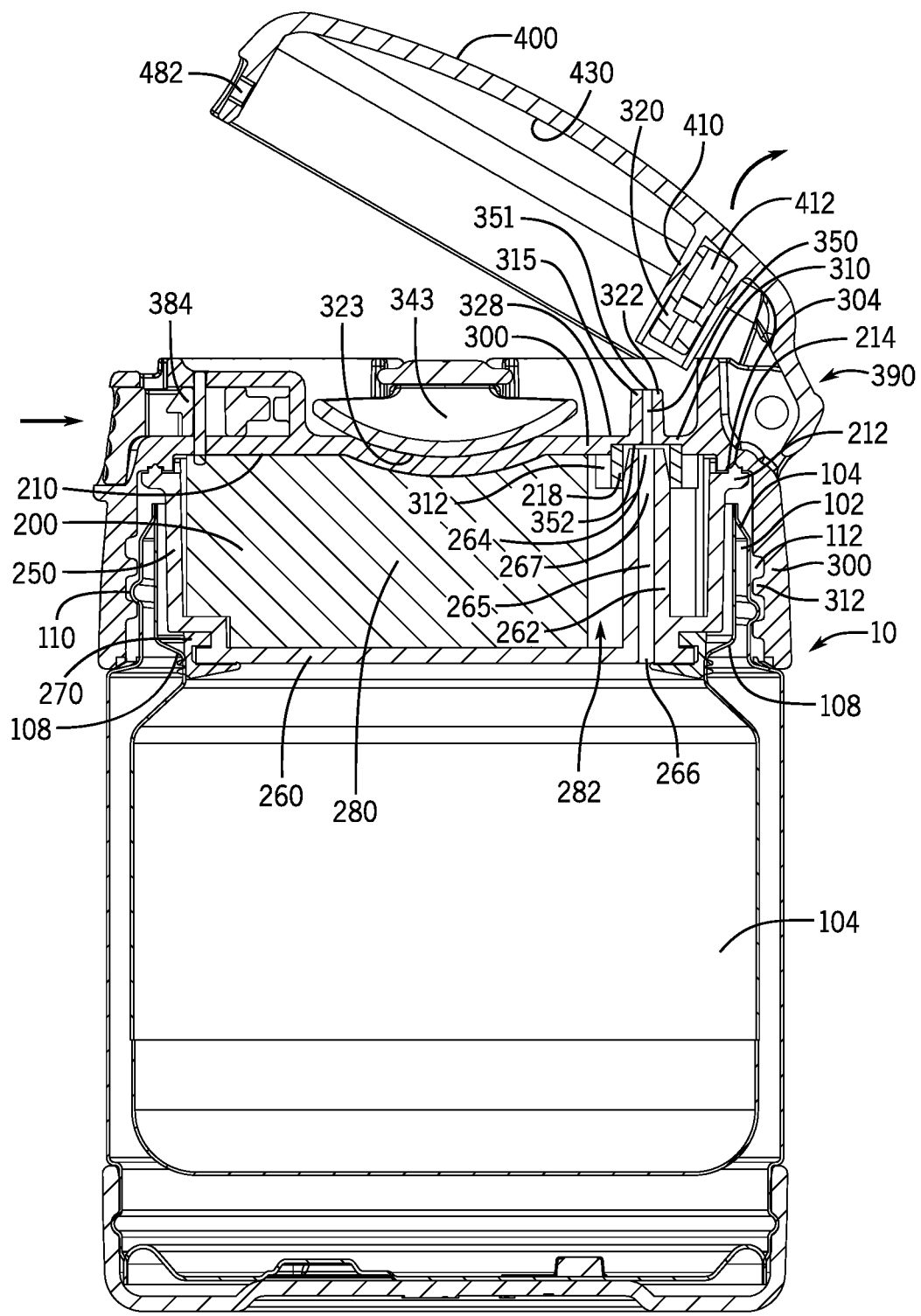
FIG. 6 is a sectional view of the food container with the lid assembly in the open position.

With reference to FIG. 5, the illustrated aspect of the container 100 includes a neck 108 with a threaded exterior surface 112. The cap 300 includes a threaded internal surface 312. The cap 300 is engaged to the container 100 by threadably engaging the threaded internal surface 312 of the cap 300 with the threaded exterior surface 112 of the neck 108. However, the container 100 and cap 300 may include any complementary engaging structures such as a threaded engagement, snap-fit engagement, frictional engagement, bayonet engagement, or other engagements configured to removably attach the container 100 to the lid assembly 150.

With reference to FIG. 5, the illustrated stopper 200 includes the upper portion 210, the sidewall 250, and the bottom portion 260. As the stopper 200 is urged to the container 100, a lower stopper seal 270 is urged or pressed against an internal surface of the neck 108 or the container 100 to seal the container 100 to a closed position. The lower stopper seal 270 may be positioned on a lower, outer diameter of the stopper 200 approximately at the junction of the sidewall 250 and the bottom portion 260. Insulation 280 may also be contained in an interior of the stopper 200.

The upper portion 210 of the stopper 200 may include a flange portion 212 with a ridge portion 214. When the cap 300 is threaded to the container 100, the cap 300 urges against the flange portion 212 of the stopper 200. A groove 304 in a lower surface of the cap 300 aligns with the ridge portion 214 to help provide approximately even closing pressure to the stopper 200 and to encourage proper alignment between the cap 300 and the stopper 200.

The stopper 200 may include a vent passage that provides for gas/air to pass to or from the container 100, when the stopper 200 is closing the container 100. This allows interior pressure within the container 100 to equalize with ambient pressure.

An upper portion 310 of the cap 300 includes a first complementary biasing structure, which in this aspect is a projecting member 315. In this aspect, the projecting member 315 extends upward from an upper surface 328 of the upper portion of the cap 300. The projecting member 315 engages with a second complementary biasing structure, which is a receiving member 410 of the lid 400 in this aspect. The projecting member 315 and the receiving member 410 cooperate to bias or urge the lid 400 to an open position. In this aspect, the receiving member 410 extends downward from an inner surface 430 of the lid 400.

In this aspect, the receiving member 410 includes a cylindrical shape with an open interior 412. A biasing member 320 is positioned in the open interior 412. When the lid 400 is closed, the projecting member 315 enters the receiving member 410 and compresses or biases the biasing member 320. A distal portion 322 of the projecting member 315 pushes against the biasing member 320 contained in the receiving member 410. When the lid 400 is unlatched or unlocked, the compressed or biased biasing member 320 urges against the projecting member 315 and/or the receiving member 410 to urge the lid 400 to the open position. In certain aspects, the projecting member 315 and end surface of the receiving member 410 generally include a hard material strong enough to compress the biasing member 320.

In other aspects, the relative positions of the projecting member 315 and the receiving member 410 may be reversed. For example, the projecting member 315 may extend downward from the inner surface 430 of the lid 400 and the receiving member 310 may extends upward from the upper surface 328 of the upper portion of the cap 300. The projecting member 315 may be configured in alternative structures such as other projecting members or structures, etc. with different shapes, etc. In other aspects, the projecting member 315 may include square, rectangular, triangular, geometric, and other shapes that fit into or are received by the receiving member 410.

The closing of the lid 400 aligns the projecting member 315 with the receiving member 310. The closing of the lid 400 compresses and/or biases the biasing member 320.

In other aspects, the biasing member 320 may be integral or affixed to the distal portion 322 of the projecting member 315. For example, the biasing member 322 may be bonded to the distal portion 322 of the projecting member 315.

The biasing member 320 may include a flexible or resilient material or structure that compresses and expands or biases and unbiases with sufficient force to urge or drive the lid 400 to the open position. In one aspect, the biasing member 320 includes a silicone material shaped to fit in the open interior 412 of the receiving member 310. In other aspects, the biasing member 320 includes a rubber or other elastomeric composition with sufficient resiliency to urge or drive the lid 400 to the open position. In other aspects, a torsion spring, leaf spring, or other mechanical spring may be housed in the open interior 412 of the receiving member 410 or engaged to the distal portion 322 of the projecting member 315.

The lid 400 and the cap 300 include complementary locking or latching structures that lock or latch to hold the lid 400 in the closed position. When the lid 400 is closed, the biasing member 320 is biased or compressed. When the lid 400 is unlatched, the lid 400 will automatically open due to the bias from the biasing member 320. The biasing member 320 automatically urges the lid 400 to the open position when the complementary locking or latching structures are unlocked or latched.

Figure 4:
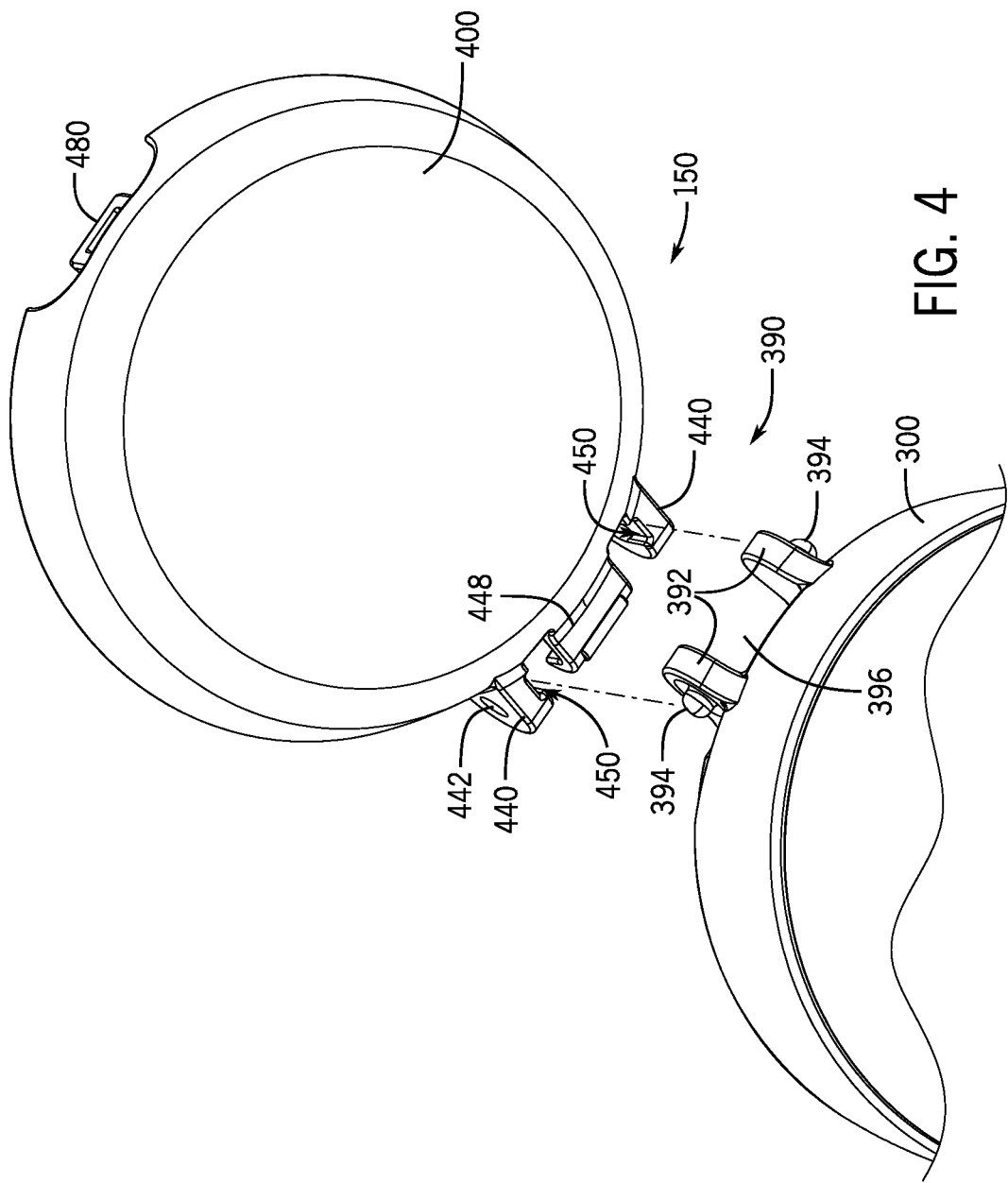
FIG. 4 is an exploded view of the lid assembly showing the hinge mechanism.

The lid 400 and the cap 300 include complementary hinging mechanisms that provide for the lid 400 to move to the open position relative to the cap 300. In this aspect, as shown in FIG. 4, a hinge 390 is formed by hinge uprights 392 on the cap 300 that are spaced from one another to define a center gap 396. In this aspect, the outward facing surfaces of the hinge uprights 392 are provided with hinge pins 394. The lid 400 has a pair of hinge bearings 440 that are spaced from one another by a distance to span the outside of the hinge uprights 392. Openings 442 are provided through each of the hinge bearings 440 into which the pins 394 fit when the hinge parts are connected to one another. A center cover 448 extends between the hinge bearings 440. The hinge bearings 440 include channels 450 that lead from a top surface of the lid 400 to the openings 442 into which the hinge pins 394 fit. The hinge 390 provides for the lid 400 to be easily detached and reattached to the cap 300 since the hinge pins 394 may travel through the channels 450.

In other aspects, the lid 400 and the cap 300 may include other hinging and pivoting connections.

In this aspect, the lid assembly 150 having a cap 300 includes a locking mechanism 380 that releasably holds the lid 400 closed. In this aspect, the lid 400 includes a tab portion 480 with an opening 482. The locking mechanism 380 includes a button member 382 and a catch mechanism 384. The catch mechanism 384 engages and disengages the opening 482 or an interior edge of the tab portion 480. The user presses or pushes the button member 382 to disengage the catch mechanism 384 from the opening 482 or the interior edge of the tab portion 480. When the user presses the button member 382, the catch mechanism 384 is disengaged from the opening 482 or interior edge and the biasing member 320 automatically urges the lid 400 to the open position. In certain aspects, the button member 382 and the catch mechanism 384 are part of a single-piece construction, such that when the button member 382 is moved the catch mechanism 384 is also moved. In other aspects, the button member 382 and catch mechanism 384 may otherwise interact or connect such that pressing the button member 382 causes a change in position of the catch mechanism 384.

In other aspects, the lid 400 and the cap 300 may include other complementary locking or latching structures to hold the lid 400 in the closed position, such as, for example, clasps, hooking members, flexible tabs and catches, clips, etc.

A storage region 370 is formed between the upper surface 328 of the cap 300 and the inner surface 430 of the lid 400. In the illustrated aspect, the storage region is sized and shaped to hold one or more utensils 343. The upper surface 328 may include a recess 322, utensil holders 324, etc. to hold or accommodate the one or more utensils 343. The storage region 370 may also contain or store condiments, drink additives, crackers, seasonings, other food products, etc. instead of or in addition to the utensils 343. The storage region 370 is readily opened when the user presses the button member 382

With reference to FIG. 5, the projecting member 315 may include an optional vent passage 350 through the cap 300 which is closed and opened by the lid 400. When the lid 400 is opened in a low pressure situation within the container 100, ambient air external to the food container 10 may pass through the vent passage 350 and into the interior of the container 100 in order to relieve the vacuum or pressure. In a high pressure situation within the container 100, air or gas in the interior may exit the container 100 through the vent passage 350, and out of the food container 10. The vent passage 350 includes a lower opening 352 in communication with the interior of the stopper 200 and/or the interior 104 of the container 100. The vent passage 350 includes an upper opening 351 in communication with the space above the cap 300, such as the storage region 370. The receiving member 410 may open and close the vent passage 350 when the receiving member 410 is positioned over the projecting member. In certain aspects, a gasket (not shown) may be positioned to help manage the release of air through the vent passage 350.

With reference to FIG. 5, in this aspect, the bottom portion 260 of the stopper 200 includes an optional vent tube 262. In this aspect, the vent tube 262 is integral with the bottom portion 260 of the stopper 200 and extends upwards from the bottom portion 260. In other aspects, the vent tube 262 may be built into or a part of the sidewalls 250 of the stopper 200.

The vent tube 262 includes an upper opening 264 and a lower opening 266. The lower opening 266 passes through the bottom portion 260 of the stopper 200 such that a generally hollow interior 265 of the vent tube 262 is in open connection with the interior 104 of the container 100. The lower opening 266 may be positioned over and/or in direct communication with the interior 104 of the container 100 and/or food or fluid held within the container 100. The upper opening 264 is formed at an upper portion 267 of the vent tube 262. The upper opening 264 vents to the cap 300. The upper portion 267 of the vent tube 262 may include a tapered or pointed outer diameter.

When the cap 300 is secured to the container 100 over the stopper 200, the lower opening 352 of the vent passage 350 is positioned adjacent to or proximate to the upper opening 264 of the vent tube 262. The opening of the lid 400 allows air to pass to and from the interior 104 of the container 100 via the vent passage 350 and the vent tube 262 to relieve both high and lows pressures in the container 100.

A void 282 may be formed in the insulation 280 to provide for passage of the vent tube 262 through the stopper 200. A height of the vent tube 262 is generally sized to approximately correspond to a depth of the stopper 300.

A lower portion 310 of the cap 300 may include a platform 312 that extends downward from the lower portion 310. The platform 312 may be formed around the lower opening 352 of the vent passage 350 such that the lower opening 352 is centered in a middle of the platform 312. The platform 312 may form a ring-like structure that receives the upper opening 264 of the vent tube 262. The platform 312 aids in positioning the lower opening 352 of the vent passage 350 in-line with the upper opening 264 of the vent tube 262.

The platform 312 also positions or holds a compression gasket 218 between the lower opening 352 of the vent passage 350 and the upper opening 264 of the vent tube 262. The compression gasket 218 may be contained in or partially contained in the platform 312. The compression gasket 218 assists in sealing the passage formed between the vent passage 350 and the vent tube 262. The upper portion 267 of the vent tube 262 may include the tapered or pointed outer diameter that is configured to enter into a central opening of the compression gasket 218.

During placement of the cap 300 over the stopper 200, the void 282 in the insulation 280 receives the platform 312. The void 282 provides a natural target for the user to insert the platform 312 to aid in proper placement and/or assembly of the lid assembly 150.

Figure 7:
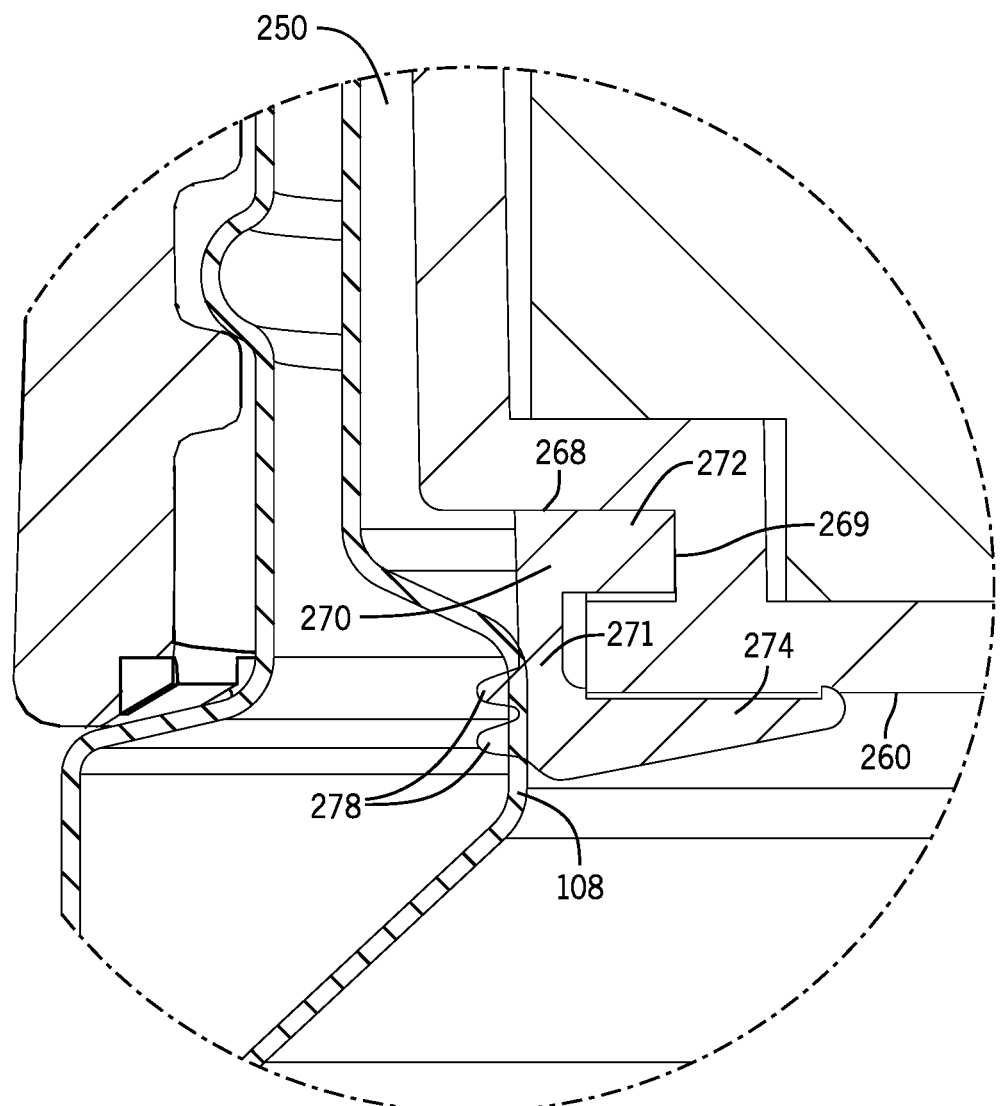
FIG. 7 is a close-up view of the lower stopper seal.

With respect to FIG. 7, the lower stopper seal 270 may be positioned on the lower, outer diameter of the stopper 200 approximately at the junction of the sidewall 250 and the bottom portion 260. The lower stopper seal 270 may include a flexibly resilient gasket that forms a seal between the stopper 200 and the container 100. The lower stopper seal 270 may include a central body 271 with a generally circular shape having a first inwardly extending portion 272 that engages with a flange portion 268 of the stopper 200. The flange portion 268 includes a groove 269 around an outer diameter of the stopper 200. The groove 269 receives the first inwardly extending portion 272. The lower stopper seal 270 may also include a second inwardly extending portion 274 that extends under the flange portion 268 and against the bottom portion 260 of the stopper 200. The central body 271 of the lower stopper seal 270 may include one or more outwardly extending fins 278 that seal against the internal surface of the neck 108 of the container 100.

When the lid 400 is closed and secured, the biasing member 320 is compressed and/or biased against the upper opening 351 of the vent passage 350. When the cap 300 is secured to the container 100 over the stopper 200, the engagement of the platform 312 over the vent tube 262 compresses the compression gasket 218, which assists in sealing the passage or space formed between the vent passage 350 and the vent tube 262. As such, when the lid 400 is closed and the cap 300 is secured, both the vent passage 350 and the vent tube 262 are substantially closed, and the liquid contents of the container 100 are generally held in the container 100 in a leak-resistant manner.

This is advantageous since there is a possibility that pressure may build up in the interior of the container 100 when the container 100 has been agitated or the food has been stored in the container 100 for too long. The opening of the lid 400 opens the vent passage 350 of the cap 300 and the vent tube 262 of the stopper 200 to release a vacuum that has formed within the container 100 when the food item has cooled in the food container 10. This provides for easier removal of the cap 300 and stopper 200. The vent passage 350 and the vent tube 262 are also able to relieve pressure within the container 100 without totally removing the cap 300 and/or stopper 200, which helps reduce inadvertent food spray when the high pressure within the container 100 is relieved.

In other aspects, the container 100 and the stopper 200 may have complementary engaging or locking mechanisms, such as a bayonet attachment, press-fit attachment, twist to lock attachment, threaded attachment, or the like to hold the stopper 200 to the container 100. Similarly, in other aspects, the container 100 and the cap 300 may have complementary engaging or locking mechanisms, such as a bayonet attachment, press-fit attachment, twist to lock attachment, threaded attachment, or the like to hold the cap 300 to the container 100. In other embodiments, the stopper 200 may be integral or a single piece construction with the cap 300 such that the stopper 200 is attached to the container 200 via the threaded attachment.

In the aspects of FIGS. 1-7, the projecting member 315, the receiving member 410, and the biasing member 320 are not a part of, a component of, or integrated with the locking mechanism 380 or other locking mechanism that holds the lid 400 in the closed position. Further, the projecting member 315, the receiving member 410, and the biasing member 320 are not part of, a component of, or integrated with the hinge 390. With respect to FIG. 3, the receiving member 410, the projecting member 315, and the biasing member 320 are spaced from or separated from the hinge 390. Similarly, the receiving member 410, the projecting member 315, and the biasing member 320 are spaced from or separated from the locking mechanism 380.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A lid assembly for a food container, the food container defining an interior to store a food product and the food container forming an opening, comprising:
    a stopper, a cap, and a lid;
    the stopper sized to removably close the opening of the container;
    the cap configured to hold the stopper in a closed position over or in the opening of the container, and the cap including a projecting member;
    the lid movably engaged to the cap, the lid configured to move between an open position and a closed position;
    the lid including a receiving member;
    the projecting member engages the receiving member to bias the lid to the open position; and,
    the projecting member extends upward from an upper surface of the cap, and the receiving member extends downward from an inner surface of the lid, and the receiving member includes an open interior that receives the projecting member, and wherein, in the closed position, a distal portion of the projecting member enters the open interior of the receiving member.

2. A lid assembly for a food container, the food container defining an interior to store a food product and the food container forming an opening, comprising:
a stopper, a cap, and a lid;
the stopper sized to removably close the opening of the container;
the cap configured to hold the stopper in a closed position over or in the opening of the container, and the cap including a projecting member;
the lid movably engaged to the cap, the lid configured to move between an open position and a closed position;
the lid including a receiving member;
the projecting member engages the receiving member to bias the lid to the open position; and
the projecting member extends upward from an upper surface of the cap, and the receiving member extends downward from an inner surface of the lid, and the receiving member includes a biasing member in a frame with an open interior that receives the projecting member, and wherein, in the closed position, a distal portion of the projecting member enters the open interior of the receiving member.

3. The lid assembly for a food container according to claim 2, wherein the frame is a cylindrical shaped element.

4. The lid assembly for a food container according to claim 1, wherein a biasing member is positioned in the open interior of the receiving member.

5. The lid assembly for a food container according to claim 4, wherein, in the closed position, the distal portion of the projecting member enters the receiving member to compress or bias the biasing member, and wherein the biasing member is a silicone composition, a rubber composition, an elastomeric composition, a torsion spring, a leaf spring, or other mechanical spring.

6. The lid assembly for a food container according to claim 1, wherein the lid and the cap include complementary locking or latching structures that lock or latch to hold the lid in the closed position, an engagement between the projecting member and the receiving member biases the lid to the open position, and the lid moves to the open position when the complementary locking or latching structures are unlocked or unlatched.

7. The lid assembly for a food container according to claim 6, wherein a first complementary locking or latching structure includes a button member and a catch mechanism connected by a sliding arm, the catch mechanism configured to engage a second complementary locking or latching structure formed as an interior edge of a tab portion of the lid.

8. The lid assembly for a food container according to claim 1, wherein the projecting member includes a vent passage which is closed and opened by the receiving member.

9. A lid assembly for a food container, the food container defining an interior to store a food product and the food container forming an opening, comprising:
a stopper, a cap, and a lid;
the stopper sized to removably close the opening of the container;
the cap configured to hold the stopper in a closed position over or in the opening of the container, and the cap including a projecting member;
the lid movably engaged to the cap, the lid configured to move between an open position and a closed position;
the lid including a receiving member;
the projecting member engages the receiving member to bias the lid to the open position; and
wherein a vent passage passes through the cap and the projecting member enters the receiving member to close the vent passage.

10. The lid assembly for a food container according to claim 1, wherein the stopper includes a vent tube comprising a lower opening and an upper opening, the lower opening is positioned over the interior of the container and the upper opening vents to the cap.

11. The lid assembly for a food container according to claim 10, wherein a lower portion of the cap includes a platform that extends downward from the lower portion, and the platform is formed around an opening in the cap, and the platform receives the upper opening of the vent tube.

12. The lid assembly for a food container according to claim 1, wherein the cap forms a vent passage comprising a lower opening and an upper opening, wherein the stopper includes a vent tube comprising a lower opening and an upper opening, and the lower opening of the vent passage is configured to be positioned over the upper opening of the vent tube to vent the container.

13. The lid assembly for a food container according to claim 1, further comprising a hinge to facilitate the moveable engagement of the lid and the cap.

14. A food container, comprising:
a container, the container defining an interior to store a food product, the container forming an opening;
a cap, the cap configured to cover the opening of the container, and the cap including a projecting member;
a lid movably engaged to the cap, the lid configured to move between an open position and a closed position, such lid and cap each including complementary locking or latching structures that lock or latch to hold the lid in the closed position;
the lid including a receiving member, the receiving member holding a biasing member in an interior of the receiving member; and,
at least a distal portion of the projecting member configured to enter the receiving member when the lid is moved to the closed position and bias or compress the biasing member such that when the complementary locking or latching structures are unlocked or unlatched, the biasing member urges the lid to the open position.

15. The food container according to claim 14, wherein a vent passage passes through the cap and the projecting member enters the receiving member to close the vent passage.

16. The lid assembly for a food container according to claim 1, further comprising a hinge to facilitate the moveable engagement of the lid and the cap, and wherein the projecting member and the receiving member are not integrated with or connected to the hinge.

17. The lid assembly for a food container according to claim 1, wherein a vent passage passes through the cap and the projecting member enters the receiving member to close the vent passage.

18. The lid assembly for a food container according to claim 1, wherein the receiving member includes a cylindrical shaped element.

19. The lid assembly for a food container according to claim 1, wherein the receiving member includes a biasing member held in the open interior.

20. The lid assembly for a food container according to claim 1, wherein the lid and cap further comprising complementary locking or latching structures that lock or latch to hold the lid to a closed position, and the projecting member and the receiving member are not integrated with or connected to the complementary locking or latching structures.

* * * * *